United States Patent
Stenberg et al.

(10) Patent No.: US 11,920,410 B2
(45) Date of Patent: Mar. 5, 2024

(54) DRILL TOOL AND SYSTEM FOR DRILL TOOL IDENTIFICATION

(71) Applicant: EPIROC DRILLING TOOLS AKTIEBOLAG, Fagersta (SE)

(72) Inventors: Göran Stenberg, Fagersta (SE); Henrik Sundberg, Örebro (SE)

(73) Assignee: EPIROC DRILLING TOOLS AKTIEBOLAG, Fagersta (SE)

( * ) Notice: Subject to any disclaimer, the term of this patent is extended or adjusted under 35 U.S.C. 154(b) by 0 days.

(21) Appl. No.: 17/798,616

(22) PCT Filed: Feb. 8, 2021

(86) PCT No.: PCT/SE2021/050093
§ 371 (c)(1),
(2) Date: Aug. 10, 2022

(87) PCT Pub. No.: WO2021/162611
PCT Pub. Date: Aug. 19, 2021

(65) Prior Publication Data
US 2023/0088887 A1    Mar. 23, 2023

(30) Foreign Application Priority Data
Feb. 13, 2020   (SE) .................... 2050157-3

(51) Int. Cl.
*E21B 17/00*    (2006.01)
*G06K 19/06*    (2006.01)

(52) U.S. Cl.
CPC ...... *E21B 17/006* (2013.01); *G06K 19/06037* (2013.01)

(58) Field of Classification Search
CPC .............. E21B 17/00; G06K 19/06037; G06K 19/06121
See application file for complete search history.

(56) References Cited

U.S. PATENT DOCUMENTS

| | | | |
|---|---|---|---|
| 5,142,128 | A | 8/1992 | Perkin et al. |
| 9,611,703 | B2 | 4/2017 | Spriggs |
| 2002/0014966 | A1 | 2/2002 | Strassner, II et al. |

(Continued)

FOREIGN PATENT DOCUMENTS

| | | |
|---|---|---|
| WO | 2010/086671 A1 | 8/2010 |
| WO | 2012/115717 A2 | 8/2012 |
| WO | 2017/027656 A1 | 2/2017 |

OTHER PUBLICATIONS

International Search Report and Written Opinion dated Mar. 18, 2021 for International Application No. PCT/SE2021/050093, 8 pages.

*Primary Examiner* — Laura A Gudorf
(74) *Attorney, Agent, or Firm* — Sage Patent Group

(57) ABSTRACT

The present disclosure relates generally to the field of drill tool identification. More particularly, it relates to a drill tool and a system configured for such drill tool identification. The drill tool includes a machined marking on a perimeter surface, wherein the machined marking is positioned on a segment of the perimeter surface and includes a matrix of indentations having predetermined column and row positions to convey an identity of the drill tool, and wherein the machined marking is optically readable from a plurality of single directions when mounted in a drill rig.

9 Claims, 8 Drawing Sheets

(56) References Cited

U.S. PATENT DOCUMENTS

| | | | |
|---|---|---|---|
| 2009/0102863 A1* | 4/2009 | Wei | G06K 7/1456 |
| | | | 345/644 |
| 2011/0315261 A1 | 12/2011 | Coleman | |
| 2014/0006227 A1 | 1/2014 | Griggs et al. | |
| 2014/0326507 A1 | 11/2014 | Spriggs | |
| 2016/0194950 A1 | 7/2016 | Zheng et al. | |
| 2016/0342916 A1* | 11/2016 | Arceneaux | G06Q 10/06313 |
| 2019/0057295 A1 | 2/2019 | Koekemoer | |

* cited by examiner

S51 Obtain visual image

S52 Perform image processing of obtained visual image

S53 Retrieve identification data

S54 Validate identification data

Figure 5A

DRILL TOOL AND SYSTEM FOR DRILL TOOL IDENTIFICATION

CROSS-REFERENCE TO RELATED APPLICATIONS

This application is a 35 U.S.C. § 371 national stage application for International Application No. PCT/SE2021/050093 entitled "DRILL TOOL AND SYSTEM FOR DRILL TOOL IDENTIFICATION", filed on Feb. 8, 2021, which itself claims priority to Swedish Patent Application No. 2050157-3 entitled "DRILL TOOL AND SYSTEM FOR DRILL TOOL IDENTIFICATION", filed on Feb. 13, 2020, the disclosures and contents of which are hereby incorporated by reference in their entireties.

TECHNICAL FIELD

The present disclosure relates generally to the field of drill tool identification. More particularly, it relates to a drill tool and a system configured for such drill tool identification.

BACKGROUND

When performing drilling operations for mining or tunneling, e.g., in rock-type materials, various kinds of drilling rigs are used. In many instances, the drilling rigs use attachments in the performing of the drilling functions. For example, a breaker attachment can be used for demolishing concrete or rock by utilizing hydraulics to deliver a percussive force to the concrete or rock. There are different types of drilling rigs, wherein "DTH" (down the hole)-drilling rigs and top hammer drilling rigs are two commonly used rigs for drilling. Drilling operations may be performed in a vertical, or close to vertical, direction, but upward drilling and horizontal drilling are also possible. Other applications require other types of drilling equipment; drilling rigs adapted for operation also in other directions are known in the art.

As rock drilling is performed in hard materials special kinds of drill tools are used for such operations. Examples of such drill tools comprise drill bits, shank adapters, rods, and tubes. When operated, the drill tools are exposed to harsh conditions. This is especially true for drill bits that will be subject to significant wear during operation and will require maintenance in the form of replacement and/or re-grinding, which in turn leads to a need to remove and attach drill tools to the drilling rig. Drill bits are replaced due to damage, age, normal wear and tear, etc.

One common drill technique is percussive drilling, where, for example, a percussion device, such as a hammer device, repeatedly strikes the drill bit, directly, or via a drill string, to transfer percussive pulses to the drill bit and further into the rock. Percussive drilling may be combined with rotation in order to obtain a drilling where buttons, inserts, of the drill bit strikes fresh rock at each stroke, thereby increasing the efficiency of the drilling. High energy pulses are transferred through the drill string with a frequency of about 20-200 Hz and peak force about 200-900 kN.

Since different drill tools are configured for different applications, it is essential to match the drill tools to the equipment and the operating need, i.e., to ensure that drill rigs and other type of drilling equipment is configured with the right drill tool for the intended operation. Furthermore, there is a need to ensure that the replacement of the drill tools is made with a replacement part that meets the requirements of the intended application, e.g., as set by an original equipment manufacturer (OEM). If an operator chooses to install non-OEM compliant drill tools in the drilling rig, it is possible that those drilling tools will not meet the specifications and required quality; the effect may be detrimental to the performance and reliability of drilling operation when a replacement drill tool is not able to withstand required performance levels without failing. The possibility to reliably identify the drill tools needing to be replaced is a key aspect of the ability to ensure proper replacement actions. There is also a need to identify and track the drill tools from the manufacturing facility through the logistic chain all the way to the customer and in the operation chain including service and recycling or destruction. This will improve the understanding of the consumption rate at the customer and may be used for forecasting.

The identification process usually requires matching of drill tool labeling to drill tool specific information, e.g., information stored in a data base. The process of retrieving such drill tool specific information may be advanced by using machine reading and automated information retrieval from a data base.

US2016/0194950 A1 discloses a drill pipe identification system that enables matching of a drill pipe identifier to information stored in a data base. In the proposed drill pipe identification system, the identifier is built into the pipe by milling/cutting into the pipe. The identifier is provided along a circumference of the pipe, in one or multiple rows, and reading is enabled by one or more sensors mounted within the drill rig. Reading is performed by rotating the drill pipe in front of the one or more sensors to enable remote reading of the identifier code.

U.S. Pat. No. 9,611,703 B2 disclose another drill pipe identification system wherein drill pipe history may be retrieved from a central storage. The compiled history is accessible by reading an identification code on the drill pipe and using this to retrieve data corresponding to the specific identification code. The identification code of the drill pipe is welded or embossed along a circumference of the drill pipe and extracted by means of one or more sensors mounted at predetermined positions within a drill rig.

Thus, solutions to enable identification of a drill pipe and retrieve associated data are part of the background art. The known solution uses a set up with permanent sensors, mounted at predetermined fixed positions, to extract bar code data engraved or embossed around a circumference of the drill pipe. A drawback with these installations, is the requirement for a matching positioning of the one or more sensors and the drill pipe. Reading/identification may be disabled even if there is only a small misalignment between the sensors and the circumferentially positioned identifiers. Furthermore, the mounting of sensors in a drill rig environment has the draw back that the sensor will be exposed to a harsh environment and may need service/replacement on a regular basis.

In the background art, attempts have been made to overcome the drawbacks of having a permanent sensor reading installation by using bar code labeling or NFC/RFID tagging of drill tools, and use of associated readers.

However, while offering high reliability in the machine reading of unused drill tools, as well as enabling reading using non-stationary sensors, bar code labelling as well as NFC/RFID tagging has proven unable to withstand the harsh conditions and the high energy transfer that the drill tools are subjected to during operation. Consequently, background art attempts to configure drill tool identification systems, using machine reading of bar code labels or NFC/RFID tags, have failed to provide a solution capable of identifying drill tools that have been exposed to long use or are at the end of their life cycles.

Consequently, there is a need for a robust and wear-resistant solution for machine readable identification of a drill tool.

SUMMARY

It is therefore an object of the present disclosure to provide a drill tool and a drill tool identification system that seeks to mitigate, alleviate, or eliminate all or at least some of the above-discussed drawbacks of presently known solutions.

This and other objects are achieved by means of a drill tool and drill tool identification system as defined in the appended claims.

According to a first aspect of the present disclosure, a drill tool, configured for use in a drill rig arranged to perform rock drilling operations, is provided. The drill tool comprises a machined marking on a perimeter surface of the drill tool, wherein the machined marking is positioned on a segment of the perimeter surface and comprises a matrix of indentations having predetermined column and row positions to convey an identity of the drill tool. The machined marking is optically readable from a plurality of single directions when mounted in the drill rig.

The drill tool, comprising the machined marking, provides the specific advantage of offering an identification that will withstand wear on the drill tool and that will enable remote identification throughout the life-cycle of the drill tool, i.e., an identification that do not require a mounting of the sensor on the drill rig or in a fixed position vis-à-vis the drill tool. The machined marking is adapted to convey an identity of the drill tool, i.e., providing an identity code unique for the drill tool so that that the drill tool may be uniquely identified by means of image detection.

In some examples, the machined marking is positioned on a segment having an angular range of 30° to 120°, and preferably 30° to 90°.

In some examples, the matrix of indentations comprises at least three indentations, and wherein the at least three indentations are arranged to have corner positions in the matrix and any further one or more indentations are arranged to have non-corner positions.

In some examples, the indentations are positioned in columns and rows arranged in a matrix, e.g., a 3×3, 3×4, 4×3, 4×4, 4×5, 5×4, 5×5, 5×6, 6×5, or 6×6 matrix. According to a second aspect, a system for identification of a drill tool is provided. The drill tool is configured for use in a drill rig arranged to perform earth drilling operations or drilling operations in rock-type materials. The system comprises a drill tool comprising a machined marking on a perimeter surface of the drill tool, wherein the machined marking is adapted to convey an identity of the drill tool, and the machined marking is provided in a drill tool surface that is optically readable from a plurality of single directions when mounted in a drill rig. The machined marking is positioned on a segment of the perimeter surface and comprises a matrix of indentations having predetermined column and row positions. The system further comprises a portable image detection reader adapted to obtain one or more optical images of the machined marking from at least one a plurality of single directions, i.e., the image detection reader being positioned at corresponding positions remote from the drill rig and having a line of sight direction to the machined markings, and a processing circuitry configured to retrieve identification data for the drill tool based on the obtained one or more optical images of the machined marking.

Thus, a drill bit identification system is provided having several beneficial features. The machined marking on a surface of the drill tool—conveying the identity of the drill tool, provides for a highly robust and wear-resistant identification of the drill tool throughout the life span of the drill tool, i.e., also at the end of the life span of the drilling tool. Furthermore, the system provides the advantage of enabling a highly automated identification of the drill tool using image detection, e.g., image detection enabled using state of the art camera equipment, subsequent image processing operations and retrieval of identification data based on an obtained optical image.

In some examples, the processing circuitry is at least in part comprised in a centralized data management center or server comprising identification data and other types of add-on data to a drill tool user. The processing circuitry may also be combined with the image detection reader, e.g., in a portable unit such a smart phone, tablet or other portable, programmable unit. The identification data may be stored in a cloud application or downloaded to a local memory associated with the processing circuitry, e.g., stored as a smart phone application.

In some examples, the image detection reader is configured for wireless communication with the processing circuitry. This has the advantage that a larger set of data may be available for processing of the image detection reader. Furthermore, data from the image processing reader may be uploaded for data analytics in the processing circuitry, enabling wear analysis for a specific drill tool used for a traceable application.

In an example, a method for identifying a machined marking is provided. The method is applicable for drill tools adapted for use in a drill rig arranged to perform earth drilling operations or drilling operations in rock-type materials. The method comprises obtaining an optical image of a machined marking on a surface of the drill tool from at least one of a plurality of single directions, i.e., from one or more image detection reader positions having line of sight directions to the machined marking, and retrieving identification data based on the obtained optical image of the machined marking. The machined marking comprises a matrix of indentations having predetermined column and row positions to convey an identity of the drill tool, and the machined marking is provided on a drill tool surface that is optically readable from a plurality of single directions when mounted in a drill rig or on a drill rig surface.

Advantages of any of the above disclosed aspects and examples provide for a highly robust and wear-resistant identification of a drill tool throughout the life span of the drill tool, i.e., also at the end of the life cycle of the drill tool. Furthermore, the system provides the advantage of enabling a highly automated identification using image detection, e.g., image detection enabled using state of the art camera equipment, subsequent image processing operations and retrieval of identification data based on an obtained optical image. Thus the disclosed embodiments not only provides for a robust and wear-resistant identification of a drill tool or drill rig, but also enables identification from a remote distance, removing the need for physically aligning one or more sensors mounted in the immediate vicinity of the drill tool.

BRIEF DESCRIPTION OF DRAWINGS

Further objects, features and advantages will appear from the following detailed description of embodiments, with reference being made to the accompanying drawings. The drawings are not necessarily to scale, emphasis instead being placed upon illustrating example embodiments.

A schematically illustrates a marking implementation of the 4×4 matrix;

B schematically illustrates an alternative marking implementation of the 4×4 matrix;

FIG. 5

Figure 5B:
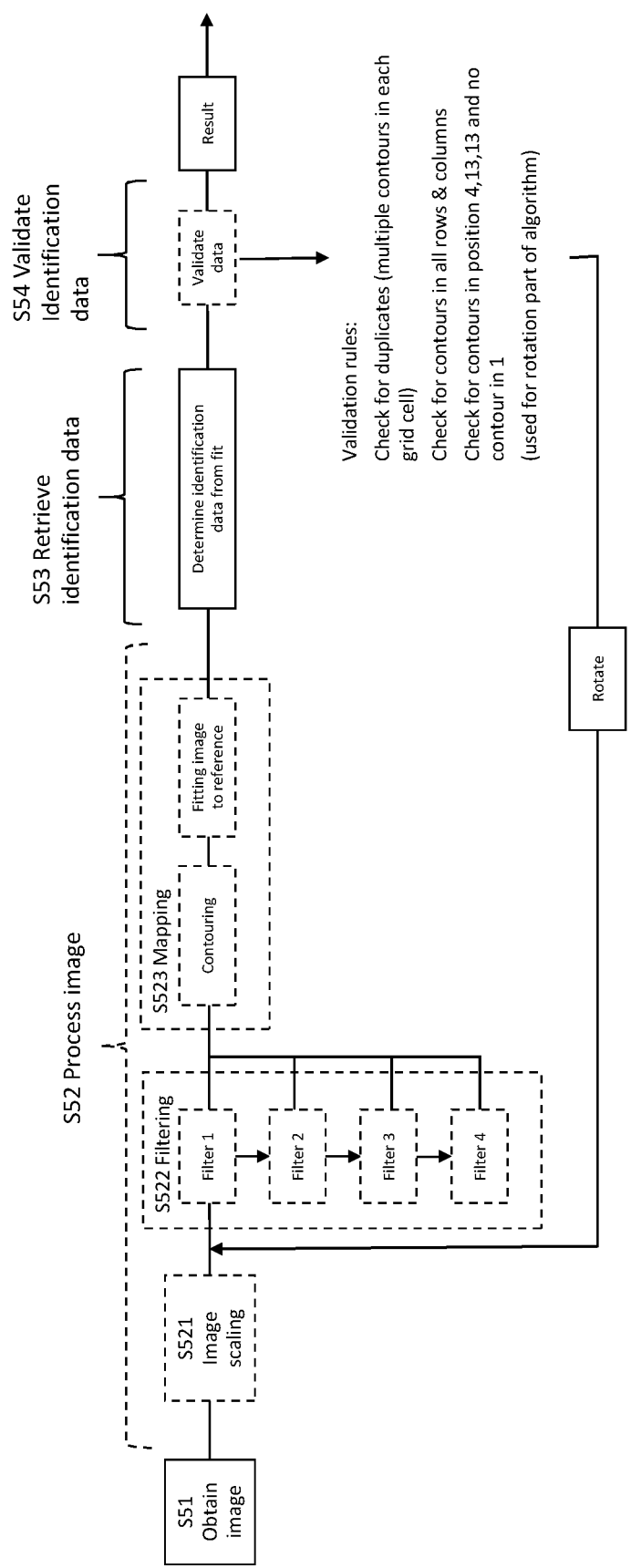
Figure 6:
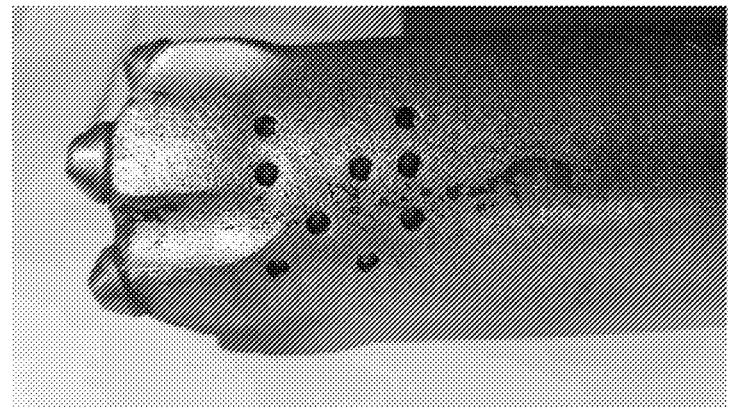
Figure 6:
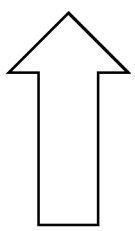
Figure 6:
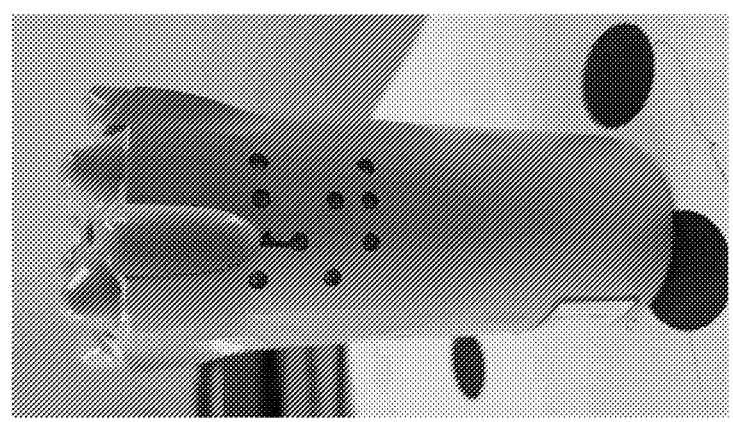

A represents a schematic flow chart illustration of an example method for identifying a drill tool, B represents a detailed flow chart illustration of the example method of FIG. 5A, C represents a detailed flow chart illustration of Filter 1 from FIG. 5B;

FIG. 6 illustrates an example drill tool before and after wear.

DETAILED DESCRIPTION

Aspects of the present disclosure will be described more fully hereinafter with reference to the accompanying drawings. The systems, arrangements, and methods disclosed herein can, however, be realized in many different forms and should not be construed as being limited to the examples presented herein. Like numbers in the drawings refer to like elements throughout the disclosure.

It should be emphasized that the term "comprises/comprising", when used in this disclosure, is taken to specify the presence of the stated features, steps or components, but does not preclude the presence or addition of one or more other features. As used herein, the singular forms "a", "an" and "the" are intended to comprise also plural forms, unless the context clearly indicates otherwise.

Embodiments of the present invention will be exemplified in the following in view of a particular kind of drill rig where drilling is carried out through the use of a percussion device in the form of a down-the-hole (DTH)/in-the-hole (ITH) hammer. The invention is, however, applicable also for other kinds of drill rigs, e.g., top hammer or surface excavation drills as well as mining machines. According to embodiments of the invention, the drill may also be in the form of a top hammer.

Figure 1:
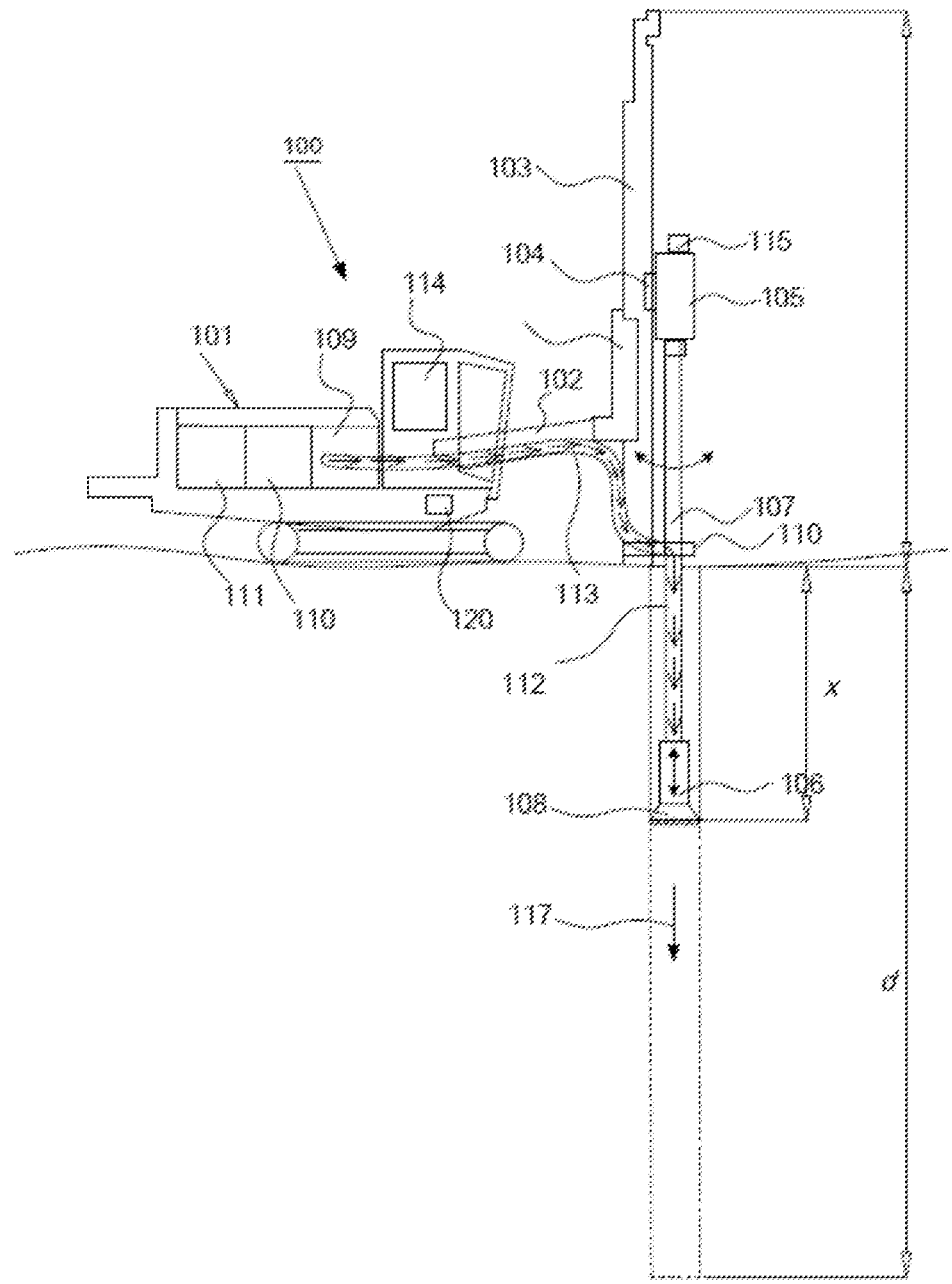
FIG. 1 illustrates an exemplary drill rig in which embodiments of the invention may be utilized.

FIG. 1 illustrates a rock drilling rig 100 configured to comprise a drill bit, or other type of drill tool or drill component, having a life cycle shorter than the rock drilling rig life cycle. The illustrated drill rig 100 is in the process of drilling a hole having an expected finished depth d, and where the drilling currently has reached a depth x.

The rock drilling rig 100 according to the present example constitutes a surface drill rig, although it is to be understood that the drill rig may also be of a type being primarily intended e.g. for underground drilling, or a drill rig for any other use. The rock drilling rig 100 comprises a carrier 101, which carries a boom 102 in a conventional manner. Furthermore, a feed beam 103 is attached to the boom 102. The feed beam 103 carries a carriage 104, which is slidably arranged along the feed beam 103 to allow the carriage 104 to run along the feed beam 103. The carriage 104, in turn, carries a rotation unit 105 which hence may run along the feed beam 103 by sliding the carriage 104.

In use, the rotation unit 105 provides rotation of a drill bit 108, and the rotation unit 105 is connected to a percussion device in the form of a down-the-hole (DTH) hammer 106 by means of a drill string 107. The rotation unit 105, in addition to rotating the drill string 107, also provides a feed force acting on the drill string 107 to thereby press the drill bit 108 against the rock face being drilled.

As the name implies, the DTH hammer (percussion device) 106 works down the hole at the end of the drill string 107, where an impact piston (not shown) of the DTH hammer 106 strikes the drill bit 108 in order to transfer shock wave energy to the drill bit 108 and further into the rock for breaking thereof. DTH hammers are useful, inter alia, in that the drilling rate is not considerably affected by the length/depth of the hole being drilled. The length/depth of the hole to be drilled may e.g. be in the order of 3-300 meters but may also be less or more.

The rotation provided by the rotation unit 105 hence transmits the rotation to the hammer 106, and thereby drill bit 108, via the drill string 107.

The rock drilling rig 100 further comprises a rig control system comprising at least one control unit 120. The control unit 120 is configured to control various functions of the drill rig 100, such as controlling the drilling process and may also be configured to comprise processing circuitry configured for processing and retrieval of component information as will be further described below.

Figure 2:
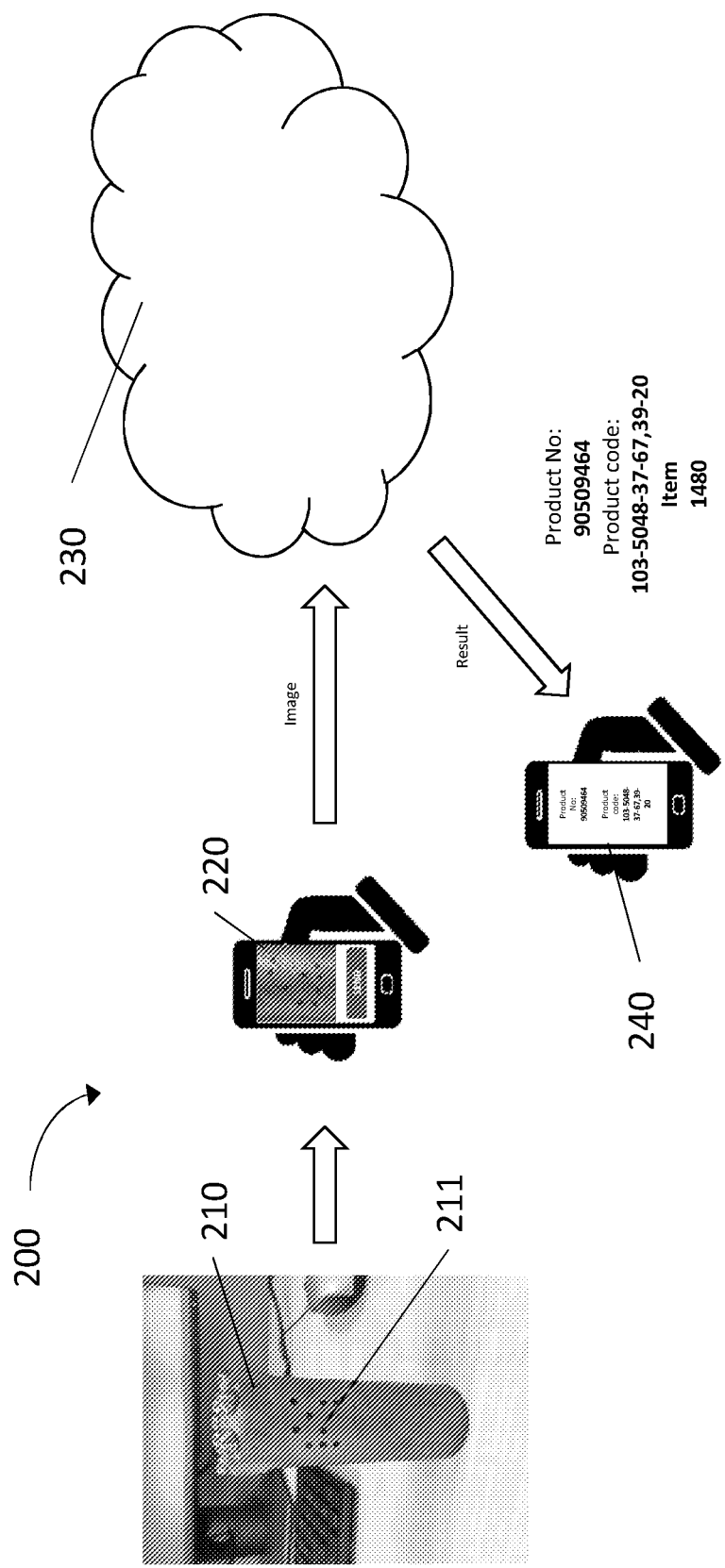
FIG. 2 schematically illustrates an example system for identification of a drill tool.

FIG. 2 schematically illustrates an example identification system 200 for identification of a drill tool 210. The system 200 includes an image detection reader 220, processing circuitry 230 and optionally a display device 240. The drill tool 210 is configured for use in a mining machine, e.g., the rock drilling rig illustrated in FIG. 1. The drill tool 210 comprises a machined marking 211, e.g., machined code, on a perimeter surface of the drill tool. The machined marking is positioned on a segment of the perimeter surface and comprises a matrix of indentations having predetermined column and row positions to convey an identity of the drill tool, i.e., representing an identification code that may be unique to the specific drill tool specimen. The segment comprising the machined marking is optically readable from a plurality of single directions when mounted in the drill rig. Thus, the machined marking is configured to enable remote reading from any of a plurality of single, remote reader positions. Consequently, there is no need to maintain the reader in the same position each time when reading the machined marking. Reading is possible from any of the plurality of single directions, e.g., by a person using a hand-held device and moving around in an area of the drill tool. The positioning of the reader may be varied each time reading is performed. The drill tool comprising the machined marking provides the specific advantage of offering an identification that will withstand wear on the drill tool and that will enable remote identification throughout the life-cycle of the drill tool, i.e., an identification that do not require a mounting of the sensor on the drill rig or in a fixed position vis-à-vis the drill tool.

The disclosed system may also be used for identification of a drill rig and/or a drill component carrying a same type of machined marking on a visually available, i.e., optically detectable, surface.

The machined marking 211 is provided on a segment of a drill tool perimeter surface, i.e., a segment surface that is optically readable from a plurality of single directions when mounted in a drill rig, e.g., on a part of an engagement portion 212 or stem of a drill bit. The machined marking is positioned on a segment optically obtainable from a remote, single position; wherein the single position may be selected from a plurality of single positions within an angular range of the segment. The machined marking may be positioned on said engagement portion and may have an angular range of approximately 30 to 120°, and preferably approximately 30 to 90°.

The same type of machined marking may also be provided on an optically readable surface of a drill rig and/or drill component, the same coding system (described below) applicable also to a machined marking provided on a drill rig or other drill component. Thus, the disclosed system using a combination of an image detection reader and processing circuitry is widely applicable for identification of machined markings regardless of which item that is subject to such coding.

The machined marking 211 includes a plurality of indentations placed in a matrix structure on a perimeter surface of the drill tool 210, e.g., on an engagement portion 212. The machined marking is arranged in a pattern and with a depth that is such that the machined marking is optically readable also following significant wear on the drill tool, i.e., at the end of a drill tool life cycle, as will be further explained below.

The matrix of indentations may comprise at least three indentations, and wherein the three indentations are arranged to have corner positions in the matrix and any further one or more indentations are arranged to have non-corner positions. The fourth corner position lacks indentation so that the corner positions may be used as references during the optical reading of the machined marking. The provisioning of the three corner indentations, enables remote reading from a reader located in any line-of-sight position to the matrix.

In some examples, the indentations are machined as non-through holes, e.g., non-through drilled holes, having a width or diameter D in the range of 0.5-10 mm and preferably 1-4 mm. The indentations may be machined with a mutual center point distance of two times a width or diameter D or the indentations, i.e., 2×D. The non-through holes may also be achieved through milling operations as well as machined in a casting operation of the drill bit stem. The non-through holes are machined with a depth of 1-10 mm and preferably a depth of 1-3 mm when measured from a surface of drill tool prior to use. At the end of the drill tool life cycle, the depth of the non-through holes may be reduced as compared to the original depth due to the significant wear on the drill tool during drill operations. The machined marking may have a variety of geometrical shapes, e.g., circular indentations obtained following a drilling operation, milled quadrangular indentations or any other type of shape possible to obtain from a machining operation and with the above mentioned dimensions.

The system further comprises an image detection reader 220 adapted to obtain an optical image of the machined marking 211. In some embodiments, the image detection reader 220 comprises a camera of a smart phone or tablet, or a smart camera for obtaining the optical image. As illustrated in FIG. 2, the image is processed in processing circuitry 230, e.g., in processing circuitry of cloud based server, to retrieve identification data for the drill tool based on the obtained optical image of the machined marking. Pre-processing of the image may also be performed, at least to a part, by using processing circuitry of the image detection reader, e.g., a data processing unit of a smart phone or tablet. The processing circuitry of the image detection reader comprises a processor coupled to a memory. A display screen and communication circuitry, e.g., a wireless transceiver, may also be associated with the image detection reader. The processor may be a microprocessor, an application-specific integrated circuit (ASIC), or other suitable device. The memory stores instructions and data used by the processor to perform the functionality of image detection, drill tool identification, and presentation of a result on the display screen. In one embodiment, the reader memory is a non-transitory computer-readable medium.

The retrieved identification data for the drill tool may be presented in a display device 240. In some embodiments, a mobile phone or wireless device is configured to comprise the image detection reader 220 and the display device 240 so that obtaining of a visual image of the machined marking and presentation of an identity is performed using the same entity. The reader may include one or more display screens that are configured to display data to a user and to provide a graphical user interface for the user to interface with the reader device. The reader display screen may be a liquid crystal display (LCD) screen, a light-emitting diode (LED) screen (e.g. a heads-up display), a projected screen, a touch screen, and the like. In other words, the user is operable to control the reader device via the graphical user interface provided on display screen.

In some embodiments, the identification result is provided to a separate display device 240 capable of outputting identification data to a drill tool operator.

The identification data comprises an identity of the drill tool, drill component or drill rig for which a visual image of the machined marking is obtained by the image detection reader. A database associated with the processing circuitry, stores identification data relevant for each specific item.

Figure 5C:
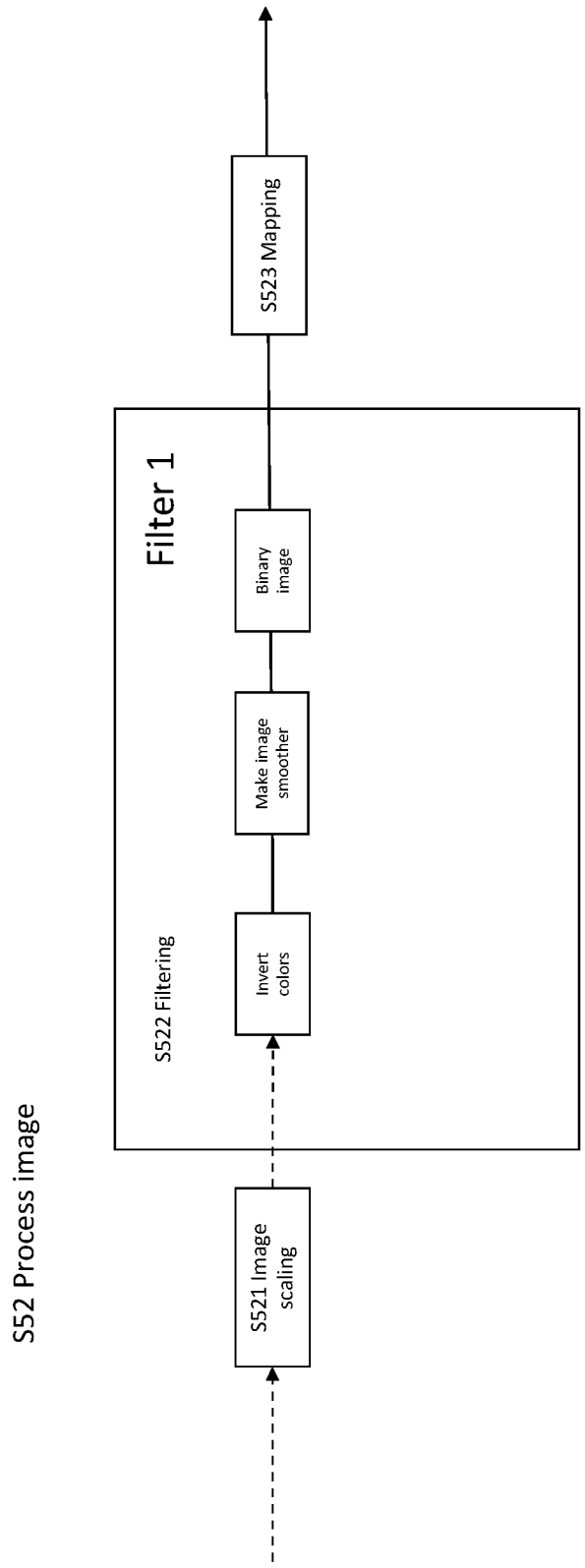

Features of the image processing will be further explained in the detailed description of FIGS. 5A-5C.

Figure 3:
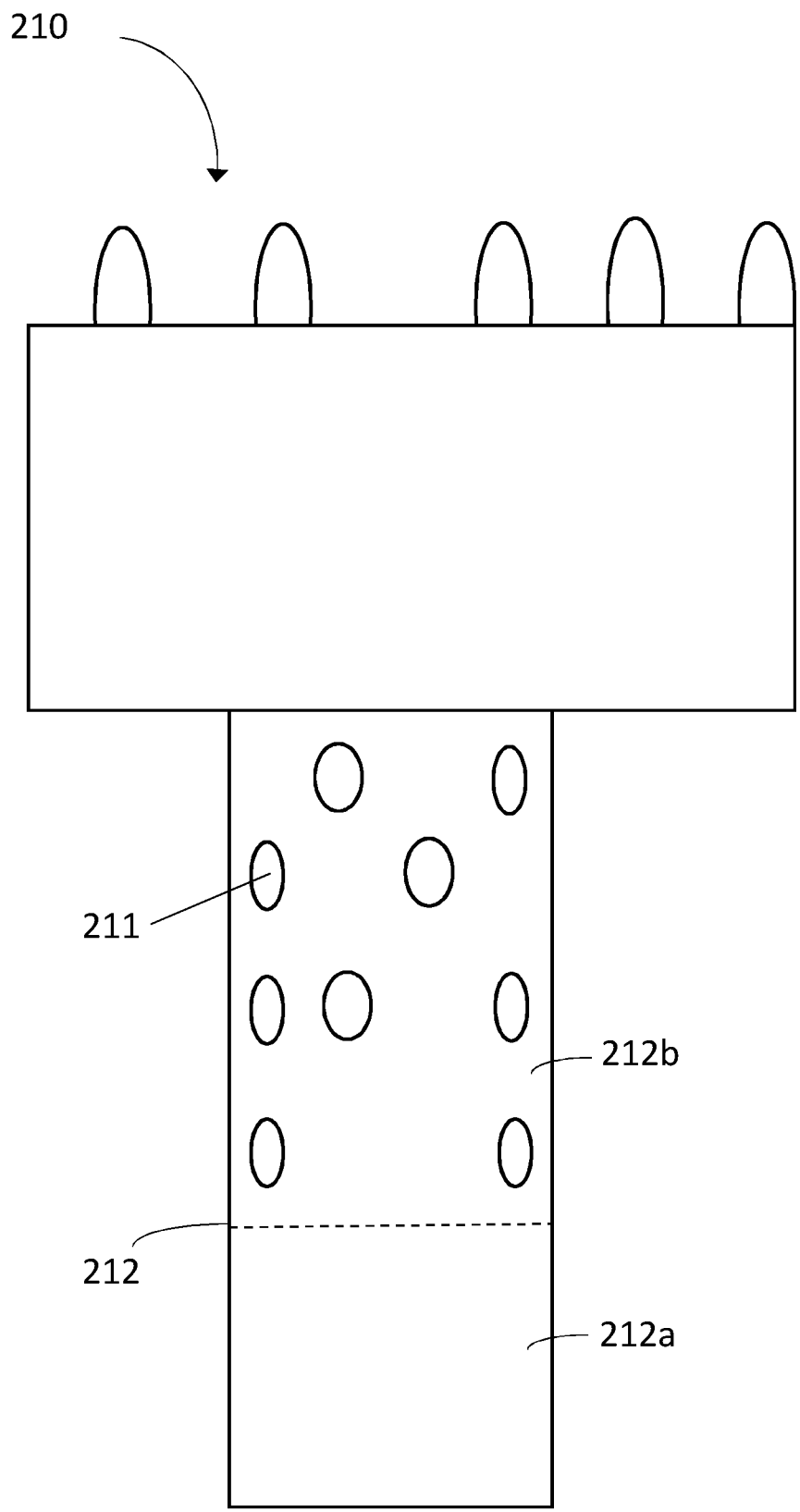
FIG. 3 schematically illustrates an example drill tool.

Turning to FIG. 3, an example drill tool is schematically illustrated as a drill bit. FIG. 3 schematically illustrates an example drill tool 210 adapted for use in an earth drilling operation or in a drilling operation in rock-type material is provided. The drill tool 210 comprises at least one machined marking 211 on a surface of the drill tool, wherein the machined marking is adapted to convey an identity of the drill tool, and the machined marking is provided in a drill tool surface that is optically readable from a plurality of single directions when mounted in a drill rig.

The machined marking is provided in a drill tool surface optically readable from a plurality of single directions when mounted in a drill rig, e.g., in a visibly exposed part of an engagement portion 212 of the drill tool. In the disclosed example, a first part 212a of the engagement portion 212 is configured for mounting in a drill rig, i.e., to be received in a drill rig. The second part 212b of the engagement portion 212 comprises the machined marking 211 and is optically readable from a plurality of single directions when the first part is mounted in the drill rig. A machined marking using the same type of machined code may also be provided on other type of drill components, in particular drill components having a life cycle expectancy shorter than that of the drill rig resulting in a need for more or less frequent component replacement. In some examples, a machined marking using the same type of machined code may be provided on the drill rig. The image detection reader of the earlier disclosed system may consequently also be used to obtain a visual image of a machined marking in a drill rig or other type of drill component and the processing circuitry may be configured to retrieve identification data also for the drill rig or drill component. The presence of the same code also on the drill rig, further enhances safety when needing to order replacement components for the drill rig since an operator may identify the drill rig from a remote position using the image detection reader and remotely process the replacement request up till the very moment when a replacement is mechanically initiated. When a larger surface is available to carry the machined marking, it is possible to scale the marking so that the machined marking is given such a dimensions that the image detection reader may be operated from a distance indicated as safe also during operation of the drill rig.

In some examples, the machined marking 211 may be arranged on an envelope or perimeter surface of the drill tool, e.g., on a curved portion of an engagement portion 212, also known as stem, configured to be at least partially engaged in a gripping tool or breaker body, e.g., of a drill rig. In the example illustrated in FIG. 3, the machined marking is provided on a portion of the stem that is visible following engagement in the tool holder. The machined marking may be machined over a curved surface possible to capture in one static image retrieved by the image detection reader, e.g., machined over a segment of the envelope or perimeter surface, e.g., machined over 10-35% of the envelope circumference and preferably over 15-25%, but may also be machined over a larger portion of the curved surface. In some examples, the machined marking may be obtained using a video stream.

Thus, the machined marking may be provided so that a visual image may be obtained from a plurality of single directions, i.e., a plurality of single line-of-sight positions of the visual detection reader.

The visual detection reader may be any type of well-known visual detection readers, e.g., a digital camera comprised in a smart phone or tablet. While the machined marking is provided in a drill tool surface that is optically readable from a plurality of single directions when mounted in a drill rig, there may also be operational states when the machined marking is not readily available for visual inspection by an image detection reader. This is of course the case during a down-the-hole drilling operation, but may also occur when mounting the drill tool in a breaker head configured to engage a larger part of the engagement portion. Thus, while the machined marking is adapted to readily convey an identity when mounted in a drill rig, the system is also applicable to a drill tool that is at least partly obscured when mounted in some drilling rigs and breaker heads and for which at least a partial disengagement from the drilling rig or breaker head is required to make the machined marking optically readable.

In some embodiments, the machined marking comprises a plurality of indentations arranged in a binary pattern, e.g., indentations positioned at predetermined columns and rows positions, i.e., a matrix. The machined marking is positioned on a segment of the perimeter surface and comprises a matrix of indentations having predetermined column and row positions to convey an identity of the drill tool, i.e., representing an identification code for unique to the specific drill tool. The segment comprising the machined marking is optically readable from a plurality of single directions when mounted in the drill rig. Thus, the machined marking is configured to enable remote reading from any of a plurality of single, remote reader positions. The indentations may be machined as drilled cavities in the drill tool. In some examples, the indentations are machined as non-through holes having a diameter in the range of 1-10 mm, preferably 2-4 mm with a diameter of 3 mm being used during testing to achieve the herein reflected results. The non-through holes are machined with a depth of 0.5-10 mm, preferably 1-7 mm and most preferred a depth of 2-5 mm when measured from a surface of drill tool prior to use. At the end of the drill tool life cycle, the depth of the non-through holes may be reduced as compared to the original depth due to the significant wear on the drill tool during drill operations. Testing reveals that a drill bit may be worn down so that a diameter of the drill bit is reduced with approximately 5 mm at the end of the drill bit life cycle, resulting in a decrease in radius of some 2.5 mm. Thus, a depth of the none-through holes greater than 1 mm is preferable for such an application. However, turning to other drill tool applications that are subject to other operating conditions, the depth of the none-through holes should be adapted to the life cycle wear for the specific drill tool.

The matrix of indentations may comprise at least three indentations, and wherein the at least indentations are arranged to have corner positions in the matrix and any further one or more indentation is arranged to have non-corner positions. The fourth corner position lacks indentation so that the corner positions may be used as references during the optical reading of the machined marking.

Figure 4A:
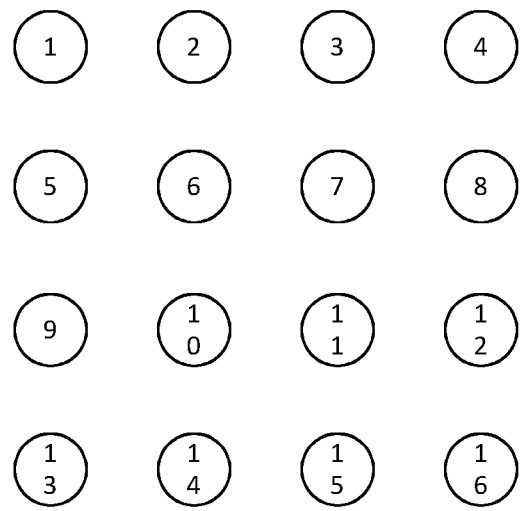
FIG. 4
Figure 4B:
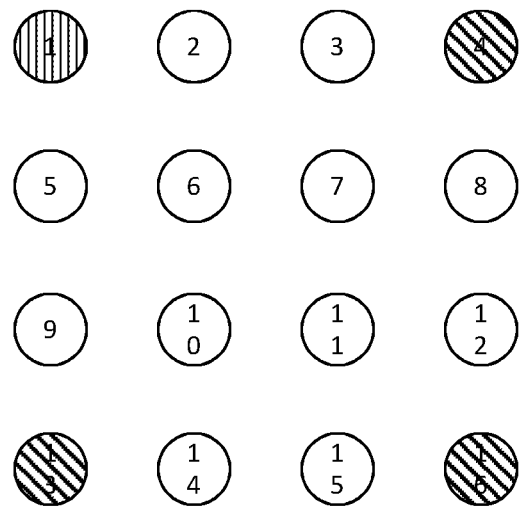

FIGS. 4A and 4B disclose an example of a machined marking arranged in the form or a 4×4 matrix. Each indentation/hole position is identified by a number, e.g., starting at 1 in a left upper corner and ending with 16 in a lower rights corner as illustrated in FIG. 4A. In some examples, corner position 4, 13 and 16 are machined indentations in the matrix pattern, while corner position 1 has no indentation. As illustrated in FIG. 4A, positions 2, 5, 10, 14 and 15 may further comprises indentations, i.e., indentations having predetermined column and row positions, that reflect an optically readable identification code for the drill tool carrying the machined marking. Turning to FIG. 4B, a similar solution is reflected with four corner positions providing a reference for matrix reading. In the disclosed example, position 4, 13 and 16 are filled indentation in the matrix pattern, while position 1 is unfilled. A known combination of predetermined column and row positions being indented or without indentation, filled or unfilled in all applications of the matrix pattern, provides the ability to use these positions as references when processing the obtained visual image from the visual image reader. A test pattern of 4 rows and columns, using 4 specified reference positions, provides for drill bit identification from any of $2^{12}$ (4096) possible combinations that may be used to reflect a drill tool identity. In some embodiments, the indentations are arranged in columns and rows arranged in a 3×3, 3×4, 4×3, 4×4, 4×5, 5×4, 5×5, 5×6, 6×5, or 6×6 matrix.

Turning to FIGS. 5A-5C, a method for identifying a drill tool is presented. The method relates to identification of a drill tool that is adapted for use in a drill rig arranged to perform earth drilling operations or drilling operations in rock-type materials. The method comprises to obtain S51 a visual image of a machined marking on a surface of the drill tool and to retrieve S53 identification data for the drill tool based on the obtained visual image of the machined marking, wherein the machined marking is adapted to convey an identity of the drill tool, and the machined marking is provided in a drill tool surface that is optically readable from a plurality of single directions when mounted in a drill rig, i.e., optically readable from a plurality of line-of-sight positions of a remote, optical reader. The retrieval of identification data is made based on the obtained visual image of the machined marking, but may be performed following an intermediary step of performing S52 image processing of the obtained visual image. In an optional concluding step, the retrieved identification data is validated.

Drill tool or drill component specific data, i.e., identification data is stored in a database accessible to the processing circuitry. The identification is retrievable following a transformation of the obtained visual image to a binary code that represents a drill tool identity. The drill tool identity enables retrieval from the data base of data associated with the specific drill tool. Such data includes item identification, but may also comprise a date when the drill tool was mounted in the drill rig, information relating to hours of operation, etc. The identification data may be updated at the time of installing or removing a drill tool from the drill rig, as well FIG. 5B discloses an example implementation of the method from FIG. 5A. Initially, a visual image of a machined marking in a drill tool is obtained S52, e.g., by means of a digital camera. In a subsequent, optional step, processing circuitry of the visual image reader may be employed to process the obtained visual image in order to enable mapping of the obtained visual image to a corresponding identification data.

The image processing may comprise a pre-processing, wherein the obtained visual image is transformed to a grey scale and rescaled in size in an image scaling step prior to performing a filtering as disclosed in FIG. 5C. Filtering may be performed with the steps and means illustrated in FIG. 5C and that will be further discussed below, but the disclosure is not limited to the performing of such filtering.

Turning back to FIG. 5B, the image processing step also comprises a step of identifying contours in the obtained visual image, e.g., in the visual image pre-processed as suggested in FIG. 5C. Image processing software is employed to identify contours in the image and an average contour size. Mapping of the contours may be performed to a reference structure, e.g., a two-dimensional grid structure, to enable the identification. Outliers are removed prior to an identification of contour position, e.g., by mapping the contour positions to a two-dimensional grid. Fitting of the contours into a grid provides for identifying positions of the contour identities. Following the mapping of contour identities, identification data is retrieved using the result of the mapping. While the above disclosed solution proposes one enabling example of retrieval of identification data based on an obtained visual image, the disclosure is not limited to this and many types of background art image recognition techniques may be applied to retrieve identification data based on an obtained image of a machined marking in a drilling tool.

Optionally, the method for identifying a drill tool that is adapted for use in a drill rig arranged to perform earth drilling operations or drilling operations in rock-type materials may also comprises a step of validating S54 the retrieved identification data to avoid ambiguous or erroneous identifications. In some examples, the step of validating S54 the identification data comprises a check for duplicates, e.g., represented by multiple contours in each grid cell. Furthermore, the validating may comprises checking contours in the check sum positions as explained in the disclosure of FIGS. 4A and 4B. Contours in the grid rows and columns are identified. If some of the validation steps fails, the image may be rotated, e.g., a rotation of 5 degrees, whereupon the above disclosed method steps are repeated for the rotated, obtained visual image; e.g., following image scaling S521. The rotation of the image may continue until a 360 degree rotation has been achieved. If problems remain in obtaining a validated result, the processing may be continued using any filters 2-4.

Turning to FIG. 5C, a filtering process is disclosed. The main purposes of filtering is to clean and enhance the image during a pre-processing step prior to performing the step of retrieving identification data. The goal of the filtering is to obtain contrast images, e.g., black and white images, without noise and that can reduce the risk of ambiguous or erroneous results from the step of retrieving identification data. FIG. 5C discloses details of filter 1, but filters 2-4 from FIG. 5B are arranged to operate in a similar way using different parameters.

The filtering in filter 1 is performed for a resized gray scale image, resulting from a step S521 of image scaling that may be performed using the steps illustrated in FIG. 5B.

Filtering S522 comprises steps of smoothing the image by applying blur, e.g., Gaussian and/or Median. The filtering further comprises one or more threshold applications to distinguish contrasts, e.g., by inverting the colors, i.e., the black and white pixels, reduce image spectrum and remove orphaned pixels in the image so that a binary image is obtained wherein the obtained visual image has been transformed to a contoured image comprising black and white, clustered pixels.

The above disclosed example method of image processing results in an identification of hole identities, e.g., the number identities suggested in FIGS. 4A and B. The hole identities may then be translated to binary or decimal numbers corresponding to identification data for the drill tool. A reference list of such identification data is stored in processing circuitry of the system, e.g., processing circuitry comprised in cloud based server. In addition to product identity, the identification data may be used to retrieve additional life-cycle information for the drill tool. Such life cycle information may include operative data retrieved from systems comprised in the drill rig.

In some aspects of the present disclosure, the method is performed by a wireless device, e.g., a smart phone or table, comprising application software developed for the purpose of drill tool identification. The application may be developed to obtain S51 visual images, i.e., camera images using the digital camera of the smart phone or tablet. In a subsequent step, the obtained visual images may be forwarded to processing circuitry to enable retrieving S53 of identification data. In one example application, the smart phone or tablet application comprises software whereby processing circuitry of the smart phone or table is used for retrieving identification data. In such an application, data base information relevant for drill tool identification is locally stored in association with the application. In another example application, the processing circuitry is at least in part comprised in a cloud server or another type of remote server comprising identification data and other types of add-on data to a drill tool user. Thus, the herein proposed method and system may at least in part be enabled as a cloud application. Following the step of obtaining S51 a visual image, the digitally obtained visual image is transmitted to a remote server, e.g., using wireless transmission circuitry of the smart phone or table. The processing circuitry performs the retrieval S53 of identification data, e.g., following image processing of the obtained visual image in a cloud application. When identification data has been retrieved, the result may be communicated to the smart phone or table and provided to a user on a display screen.

FIG. 6 discloses images of a drill tools comprising respective machined markings, the drill tool being captured at the beginning and end of a drill tool life cycle. As is evidenced by these images, the machined markings are capable of withstanding the significant wear during operation of a drill tool so that remote drill tool identification is enabled also at an end of the drill tool life cycle and may be safely performed also when the drilling rig is in an operative mode.

Turning back to rock drilling rig disclosed in FIG. 1, the identification system 200 may also comprise the rock drilling rig of FIG. 1 or any other type of rock drill or drilling machine. The rock drill and/or rock drilling rig configured to hold a drill tool may optionally comprise a machined marking, e.g., machined code, on a visible surface part of the rock drill and/or rock drilling rig. The machined marking is adapted to convey an identity of the rock drill and/or rock drilling rig. Thus, the disclosed system may also be used for identification of the rock drill, rock drilling rig and/or other drill component carrying a same type of machined marking on a visually available surface.

When carried by a rock drill, rock drilling rig and/or other drill component, the machined marking is provided on a surface that is optically readable from a plurality of single directions when mounted in a drill rig. A first part of the engagement portion of the engagement portion may be configured for mounting in a drill rig and a second part of the engagement portion may comprise the machined marking that is optically readable from a plurality of single directions when the first part is mounted in the drill rig, e.g., on a first part of an engagement portion or stem of a drill bit. The same type of machined marking may also be provided on an optically readable surface of a drill rig and/or drill component, the same coding system (described below) applicable also to machined markings provided on a drill rig or other drill component. Thus, the disclosed system using a combination of an image detection reader and processing circuitry is widely applicable for identification of machined markings regardless of which item that is subject to such coding.

The description of example embodiments provided herein have been presented for purpose of illustration. The description is not intended to be exhaustive or limit example embodiments to the precise form disclosed. Modifications and variations are possible in light of the above teachings or may be acquired from practice of various alternatives to the provided embodiments. The examples discussed herein were chosen and described in order to explain the principles and nature of various example embodiments and its practical application to enable one skilled in the art to utilize the example embodiments in various manners and with various modifications as are suited to the particular use contemplated. The features of the embodiments disclosed herein may be combined in all possible combinations of a system for identification of a drill tool, corresponding drill tools, methods and computer program products.

The invention claimed is:

1. A drill tool configured for use in a drill rig arranged to perform rock drilling operations, the drill tool comprises a machined marking on a perimeter surface of the drill tool, wherein the machined marking is positioned on a segment of the perimeter surface, wherein the machined marking is arranged on a cylindrical engagement portion, wherein a first part of the engagement portion is configured for mounting in the drill rig and a second part of the engagement portion comprises the machined marking, wherein the machined marking comprises a matrix of indentations having predetermined column and row positions to convey an identity of the drill tool, and wherein the machined marking is optically readable from a plurality of single directions when the first part is mounted in the drill rig.

2. The drill tool of claim 1, wherein the machined marking is positioned on a segment having an angular range of 30 to 120°.

3. The drill tool of claim 1, wherein the matrix of indentations comprises at least three indentations, and wherein the three indentations are arranged to have corner positions in the matrix and any further one or more indentations are arranged to have non-corner positions.

4. The drill tool of claim 2, wherein the matrix of indentations is at least one of: a 3×3, 3×4, 4×3, 4×4, 4×5, 5×4, 5×5, 5×6, 6×5, or 6×6 matrix.

5. The drill tool of claim 1, wherein the indentations are non-through cavities in the drill tool.

6. The drill tool of claim 5, wherein the non-through cavities have a depth of 1-10 mm, a diameter D of 0.5-10 mm, and mutual center point distances of greater than or equal to 2D.

7. A system for identification of a drill tool that is adapted for use in a rock drill or rock drill rig arranged to perform earth drilling operations or drilling operations in rock-type materials, the system comprising:
    a drill tool which comprises a machined marking on a perimeter surface of the drill tool, wherein the machined marking is positioned on a segment of the perimeter surface, wherein the machined marking is arranged on a cylindrical engagement portion, wherein a first part of the engagement portion is configured for mounting in the drill rig and a second part of the engagement portion comprises the machined marking, wherein the machined marking comprises a matrix of indentations having predetermined column and row positions to convey an identity of the drill tool, and wherein the machined marking is optically readable from a plurality of single directions when the first part is mounted in the drill rig;
    a portable image detection reader adapted to obtain one or more optical images of the machined marking from at least one a plurality of single directions; and
    processing circuitry configured to retrieve identification data for the drill tool based on the obtained one or more optical images of the machined marking.

8. The system of claim 7, wherein the portable image detection reader is comprised in a wireless device.

9. The system of claim 8, wherein the wireless device is at least one of: a smartphone, a smart camera, or a tablet.

* * * * *